(12) United States Patent
Vandewal et al.

(10) Patent No.: US 9,500,270 B2
(45) Date of Patent: Nov. 22, 2016

(54) SPLIT GEAR FOR AVOIDING BACKLASH WHEN ENGAGING A MATING GEAR

(71) Applicant: VCST Industrial Products, Sint-Truiden (BE)

(72) Inventors: Bart Vandewal, Alken (BE); Reymond Reyskens, Diepenbeek (BE); Steven Van Lieshout, Geel (BE)

(73) Assignee: VCST Industrial Products, Sint-Truiden (BE)

( * ) Notice: Subject to any disclaimer, the term of this patent is extended or adjusted under 35 U.S.C. 154(b) by 294 days.

(21) Appl. No.: 14/196,033

(22) Filed: Mar. 4, 2014

(65) Prior Publication Data

US 2014/0245850 A1    Sep. 4, 2014

Related U.S. Application Data

(63) Continuation of application No. 12/451,632, filed as application No. PCT/EP2008/056301 on May 21, 2008, now abandoned.

(30) Foreign Application Priority Data

May 21, 2007   (EP) .................................... 07108571

(51) Int. Cl.
   *F16H 55/18*   (2006.01)
(52) U.S. Cl.
   CPC .......... *F16H 55/18* (2013.01); *Y10T 74/19623* (2015.01)

(58) Field of Classification Search
   CPC ....................................................... F16H 55/18
   USPC .................................................... 74/409, 440
   See application file for complete search history.

(56) References Cited

U.S. PATENT DOCUMENTS

| | | | |
|---|---|---|---|
| 1,750,679 | A | 3/1930 | Mitchell |
| 4,189,951 | A | 2/1980 | Sauter |
| 5,056,613 | A | 10/1991 | Porter |
| 7,047,540 | B2 | 5/2006 | Hoch |
| 2002/0121152 | A1 | 9/2002 | White |
| 2003/0015051 | A1 | 1/2003 | Nomura et al. |

FOREIGN PATENT DOCUMENTS

| | | | |
|---|---|---|---|
| DE | 75 15 665 | * | 9/1975 |
| DE | 7515665 | | 9/1975 |
| DE | 10 2005 041 357 | * | 4/2006 |
| EP | 1211439 | | 6/2002 |
| JP | 08159242 | | 6/1996 |
| WO | 2005090830 | | 9/2005 |

* cited by examiner

*Primary Examiner* — William C Joyce
(74) *Attorney, Agent, or Firm* — Jacobson Holman PLLC

(57) ABSTRACT

Split gear (1) for avoiding backlash when engaging a mating gear (4), comprising a first (2) and second (3) toothed gear wheel, rotating means (5) for coaxially interconnecting the first (2) and second (3) gear at least partially rotatable with respect to each other around a mutual rotational axis (15) and a spring (10) resiliency interconnecting the first (2) and second (3) gear for creating a negative moment between the first (2) and second (3) gear upon alignment of the teeth (12, 13) of the first (2) and second (3) gear by rotation of the first (2) gear with respect to the second (3) gear so that the mating gear (4) can be engaged, characterized in that the spring (10) is integrally formed with the second (3) gear wheel.

13 Claims, 7 Drawing Sheets

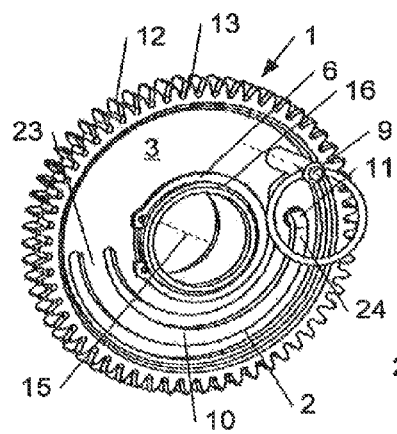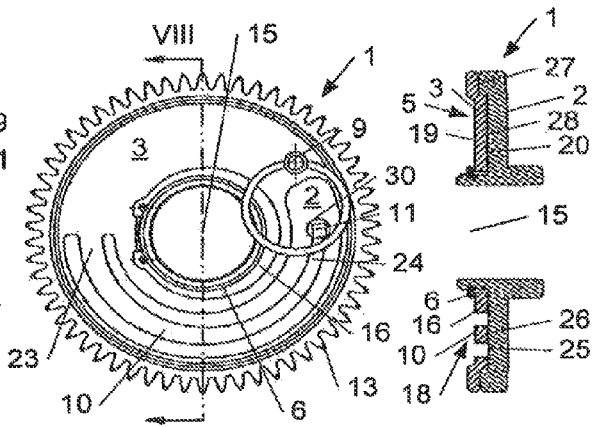
Fig. 6　Fig. 7　Fig. 8
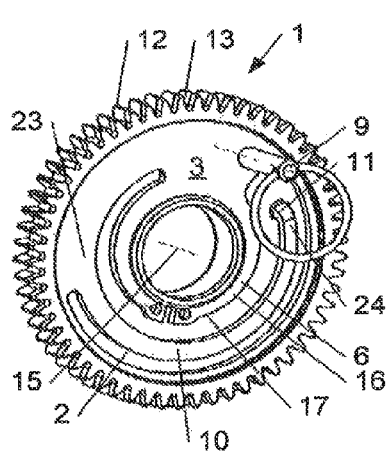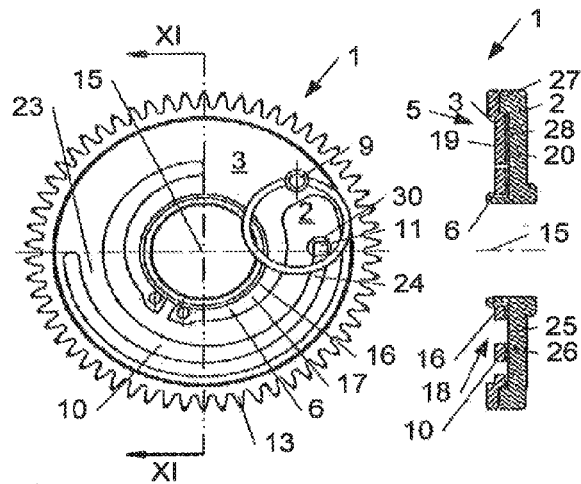
Fig. 9　Fig. 10　Fig. 11

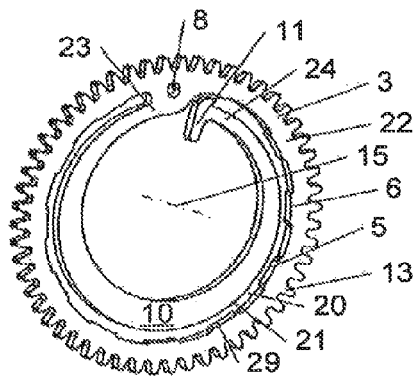
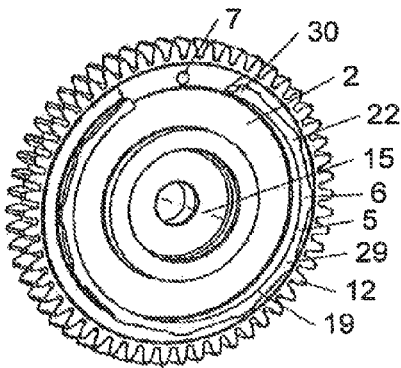
Fig. 12B   Fig. 12C
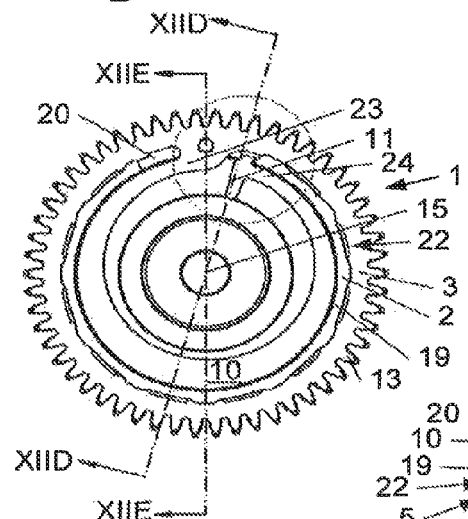
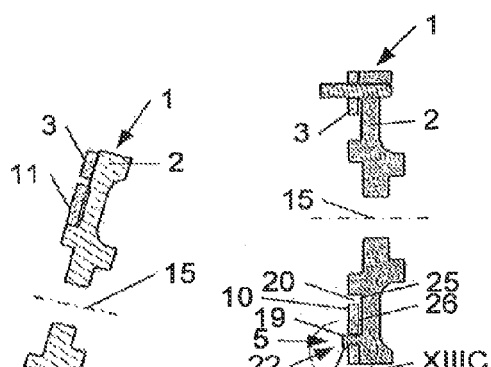
Fig. 12A   Fig. 12D   Fig. 12E
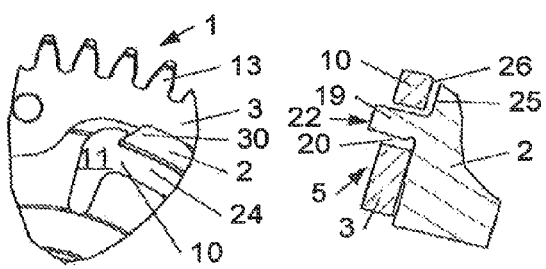
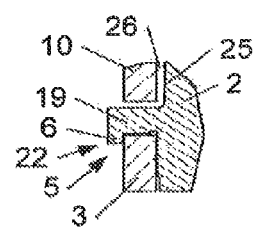
Fig. 13A   Fig. 13B   Fig. 13C

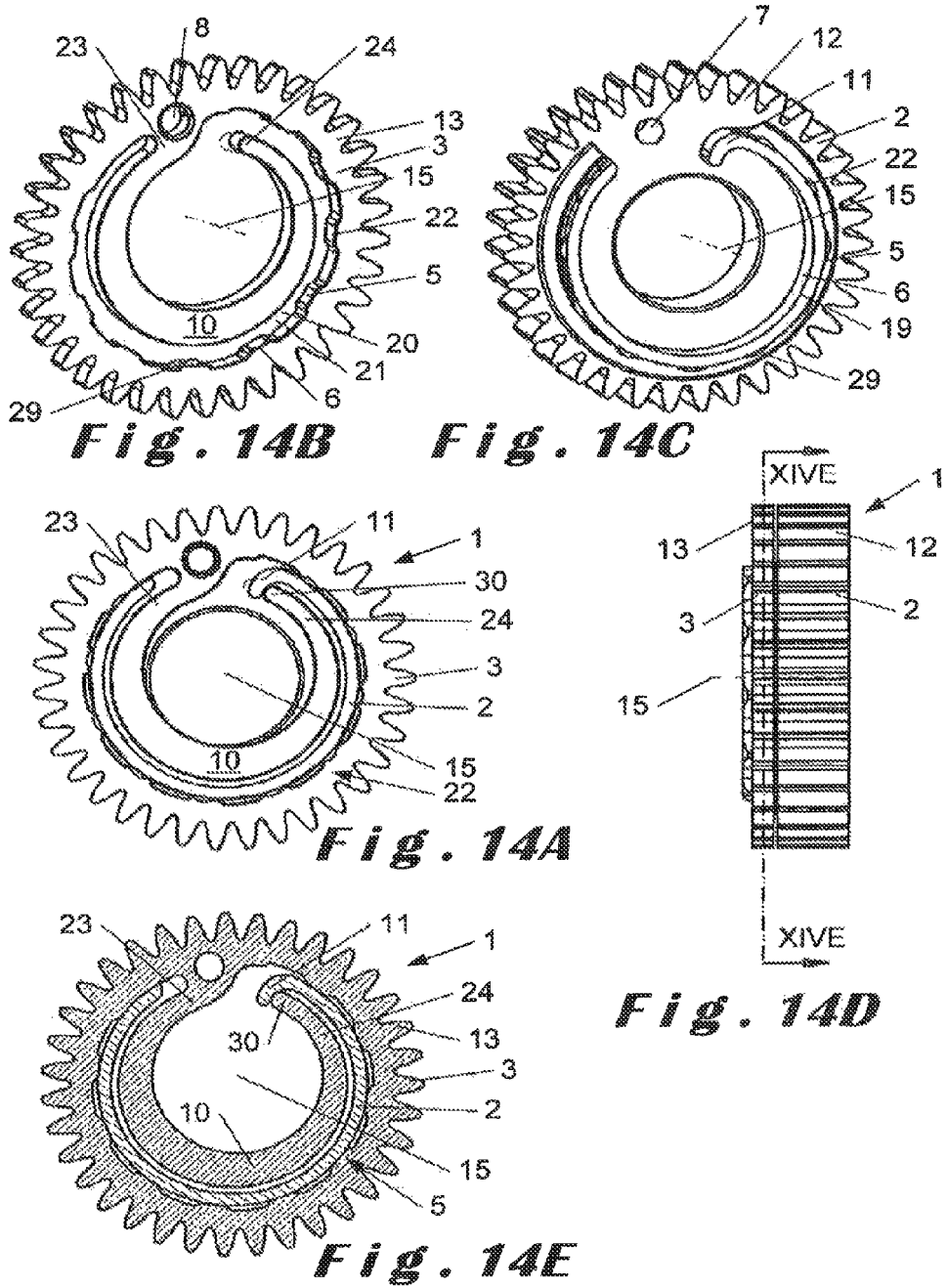

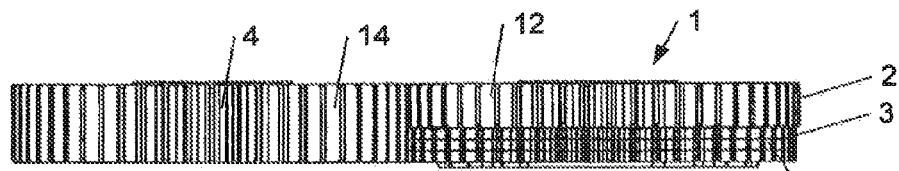
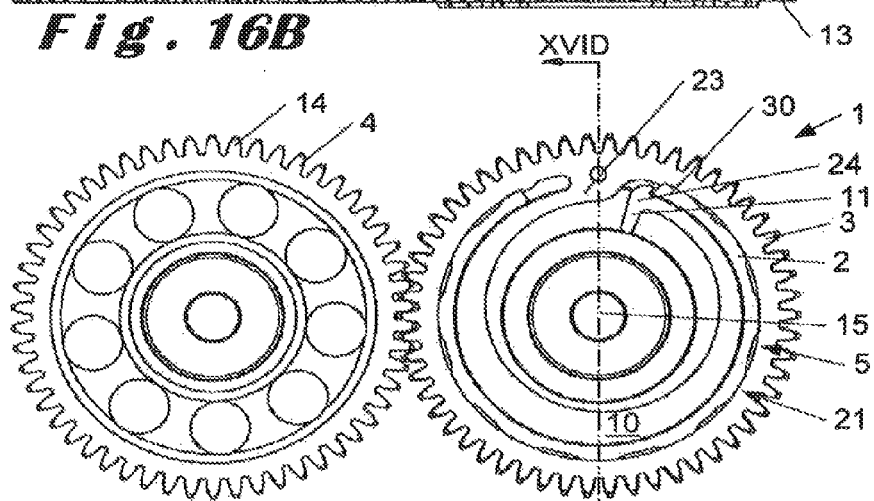
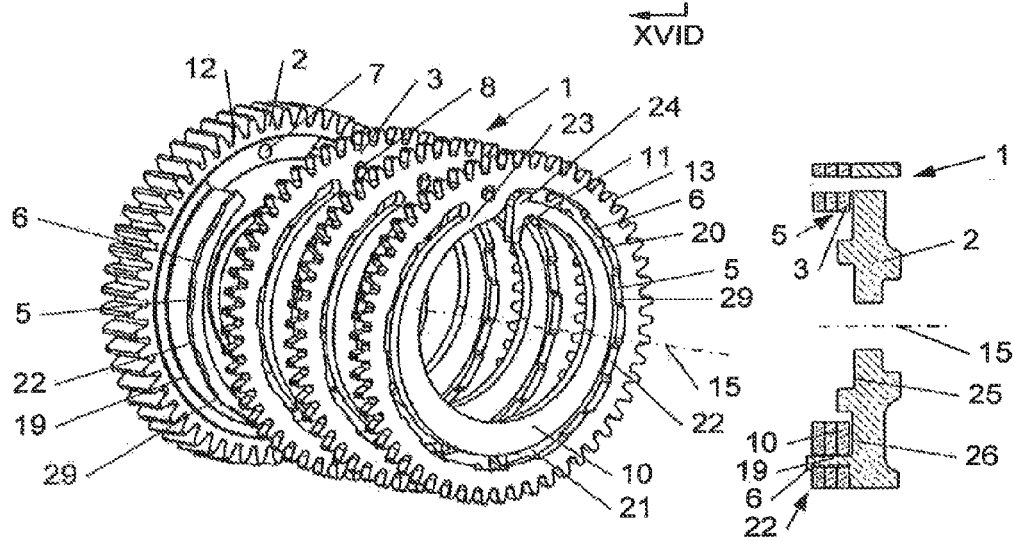

SPLIT GEAR FOR AVOIDING BACKLASH WHEN ENGAGING A MATING GEAR

This is a continuation application Ser. No. 12/451,632 filed Jun. 8, 2010, which is a national stage of PCT/EP2008/056301 filed May 21, 2008, and which has priority of EP 07108571.6 filed May 21, 2007, the disclosures of which are incorporated herein by reference.

The present invention relates to a split gear for avoiding backlash when engaging a mating gear, according to the preamble of the first claim.

The use of gear wheels in combustion engines is well known in the art. In a typical 4-stroke combustion engine for example, it may happen that the drive gear of a cam shaft engaging a mating gear is exposed to oppositely acting torques. The driving gear wheel is for example powered by the crank shaft and is subjected to a driving in the direction of rotation of the cam shaft. The driving gear is then subjected to a first torque in a direction opposing the direction of rotation of the driving gear caused by driving of the mating gear. However it is possible that the mating gear becomes driven in direction of rotation of the mating gear by means other than the driving gear, for example by reaction forces of compressed valve springs. This gives rise to a second torque, opposing the first torque, which acts on the drive gear extending in direction of rotation of the drive gear.

It is known that the second torque, also known as the opposing torque, can periodically engage the drive gear, for example when caused by compressed valve springs such that the backlash is periodically overcome, causing rattling sounds.

Several kinds of gears have been developed to solve the problem of rattling. A commonly employed device comprises a so-called split gear. Such a split gear is for example described in WO2005090830A1 and comprises a first toothed gear wheel and a second toothed gear wheel which are coaxially assembled on a shaft. The split gear comprises rotating means for rotatably interconnecting the first and second gear wheel relatively to each other around the mutual rotational axis, the shaft. The first gear wheel and the second gear wheel are resiliently interconnected by a spring element which is made as a separate part. The spring creates a negative moment between the first and the second gear wheel when the first and the second gear wheel are rotated relatively with respect to each other for aligning the teeth of the first and the second gear wheel so that the teeth of the first and second gear wheel can engage the mating gear. The negative moment extends along a direction opposing the direction of rotation of the split gear. The negative moment causes that the engaging teeth of the mating gear are clamped between the engaging teeth of the first and second gear so that backlash between the split gear and the mating gear is decreased. When opposing oppositely acting torques act on the split gear and/or the mating gear, for example as described above, the opposite torque can be absorbed by the negative moment so that rattling between the gear wheels can be decreased or can even be avoided.

These split gears however present the disadvantage that several components need to be assembled during assemblage of the split gear. The components of these split gears at least comprise the first and second gear wheel and the separate spring element. The use of these different components for example causes that the reliability of the split gear decreases, that construction of the split gear is difficult since additional steps are necessary during assemblage of the split gear and induces unwanted friction and energy dissipation causing a tolerance stack up as a consequence of which the nominal spring force required to provide sufficient torque in anti-rotation direction should be increased to provide sufficient anti-rotation torque.

It is therefore an object of the present invention to provide a split gear which is easier to assemble.

This is achieved according to the present invention by means of a split gear showing the technical features of the characterising part of the first claim.

Thereto, the spring is integrally formed with the second gear wheel.

This way, the number of separate parts needed to assemble the split gear is reduced since the spring is now integrally formed with the second gear wheel. This causes that the slit gear is easier to assemble.

Moreover separate means which were up to now necessary for fastening the spring to the second gear wheel can be dispensed with. Also the tolerance stack-up and internal friction may be reduced as compared to conventional split gears. Moreover, reliability of the split gear according to the invention increases.

In a preferred embodiment of the split gear according to the current invention, the spring is separate from the rotating means.

By separating the spring from the rotating means, the resiliency of the spring, and therefore the negative moment between the first and the second gear wheel, can be adapted independently from the rotating means. This has as a consequence that the resiliency of the spring can be determined independently from for example the distance between the teeth of the second gear wheel to the mutual rotational axis, the strength of the interconnection between the first and the second gear wheel, etc.

According to a following preferred embodiment of the split gear according to the invention, the spring is a torsion spring.

Within the context of the current application with torsion spring is meant a spring in which a first part of the spring can be resiliently rotated over at least part of an arcuate path with respect to a second part of the spring such that a negative moment is created driving the first and the second part of the spring back to their original position with respect to each other.

The inventor has found that such a torsion spring allows to offer the desired negative moment between the first and the second gear within the range of angular rotation between the first and the second gear. Moreover, the inventor found that a torsion spring can be made more compact than other types of spring while still offering the desired negative moment, which is an advantage if the split gear has to be mounted in a confined space.

According to a further improved embodiment of the split gear according to the current invention, the spring is an annular spring.

In the context of the current application with annular spring is meant a torsion spring which substantially extends at least partly arcuately around the rotational axis. Upon rotation of the second gear with respect to the first gear, the annular spring deforms causing the creation of the negative moment.

The inventor has found that an annular spring can be provided into the second gear wheel with the mass of the spring more homogeneously divided over the second gear offering a more homogeneous division of the angular mass so that a homogeneous rotation of the gear wheel is obtained.

According to a following preferred embodiment of the split gear according to the invention, the spring is substantially coplanar with the second gear wheel.

The inventor has found that such a spring improves the compactness of the split gear. Moreover, such second gears can be made more easily, for example by punching or, preferably, by fine cutting. Moreover, since the spring is substantially coplanar with the second gear wheel, the angular mass is substantially confined to the plane of the second gear wheel decreasing the occurrence of generally undesired angular momenta causing tilting of the second gear with respect to the first gear.

According to a following preferred embodiment of the split gear according to the invention, the split gear comprises fastening means for fixing the axial position of the first gear wheel with respect to the second gear wheel along the rotational axis.

The inventor has found that use of such fastening means at least decrease the need for fixing the axial position of the first and second gear wheel with respect to each other after the split gear has been mounted into its desired location so that an additional step for mounting the split gear is no longer necessary and mounting the spilt gear into its desired location becomes easier.

According to a more preferred embodiment of the split gear according to the Invention, the fastening means comprise a bayonet mount for fixing the axial position of the first gear wheel with respect to the second gear wheel upon alignment of the teeth of the first and second gear wheel.

The inventor has found that such a bayonet mount offers a reliable and simple mount for fixing the axial position of the first gear wheel with respect to the second gear wheel. Moreover, since the bayonet mount fixes the axial position of the first gear wheel with respect of the second gear wheel upon alignment of the teeth of the first and the second gear wheel when rotating the first and the second gear wheel with respect to each other, the axial position of the first and the second gear wheel is fixed with respect to each other when mounting the split gear into engagement with the mating gear so that an additional step for fixing the axial position of the first gear wheel with respect to the second gear wheel is avoided.

In yet a more preferred embodiment according to the invention, the rotating means comprise the fastening means.

The inventor has found that when the rotating means comprise the fastening means a further simplification of the construction and assembly of the split gear is achieved.

In another preferred embodiment of the split gear according to the current invention, the split gear comprises means for temporarily interlocking the angular position of the first gear wheel with respect to the second gear wheel upon alignment of the teeth of the first and second gear wheel.

These means further allow an easier mounting of the split gear to the mating gear since the teeth of the first and second gear wheel have been aligned before mounting. After the mounting of the split gear to the mating gear has been finished, the means can be removed after which the engaged teeth of the mating gear are clamped between the engaging teeth of the split gear by the negative moment.

Other details and advantages of the device according to the invention will become apparent from the enclosed figures and description of preferred embodiments of the invention.

BRIEF DESCRIPTION OF THE DRAWINGS

FIG. 6 shows a view in perspective of a different embodiment of a split gear according to the invention.

FIG. 7 shows a plan view of the split gear shown in FIG. 6.

FIG. 8 shows a sectional view VII-VII of FIG. 7.

FIG. 9 shows a view in perspective of a different embodiment of a split gear according to the invention.

FIG. 10 shows a plan view of the split gear shown in FIG. 9.

FIG. 11 shows a sectional view XI-XI of FIG. 10.

FIG. 12A shows a plan view of a different embodiment of the split gear according to the invention.

FIG. 12B shows a part of the split gear shown in FIG. 12A.

FIG. 12C shows another part of the split gear shown in FIG. 12A.

FIG. 12D shows a sectional view XIID-XIID of FIG. 12A.

FIG. 12E shows a sectional view XIIE-XIIE of FIG. 12A.

FIG. 13A shows a detail of FIG. 12A.

FIG. 13B shows a detail of FIG. 12D.

FIG. 13C shows a detail of FIG. 12E.

FIG. 14A shows a plan view of a different embodiment of the split gear according to the Invention.

FIG. 14B shows a part of the split gear shown in FIG. 14A.

FIG. 14C shows another part of the split gear shown in FIG. 14A.

FIG. 14D shows a side view of the split gear of FIG. 14A.

FIG. 14E shows a sectional view XIVE-XIVE of FIG. 14D.

FIG. 16A shows a different embodiment of a split gear according to the invention.

FIG. 16B shows a side view of the assembly of FIG. 16C.

FIG. 16C shows a plan view of the split gear of FIG. 16A mating with a mating gear.

FIG. 16D shows a sectional view XVID-XVID of FIG. 16C.

FIG. 1 shows a split gear 1 for avoiding backlash when engaging a mating gear 4 comprising a first 2 and a second 3 toothed gear wheel both comprising a circumferential rim comprising respectively first 12 and second 13 teeth. The first 2 and the second 3 gear are mounted around a mutual rotational axis 15, which also is the rotational axis 15 of the split gear 1.

Figure 1:
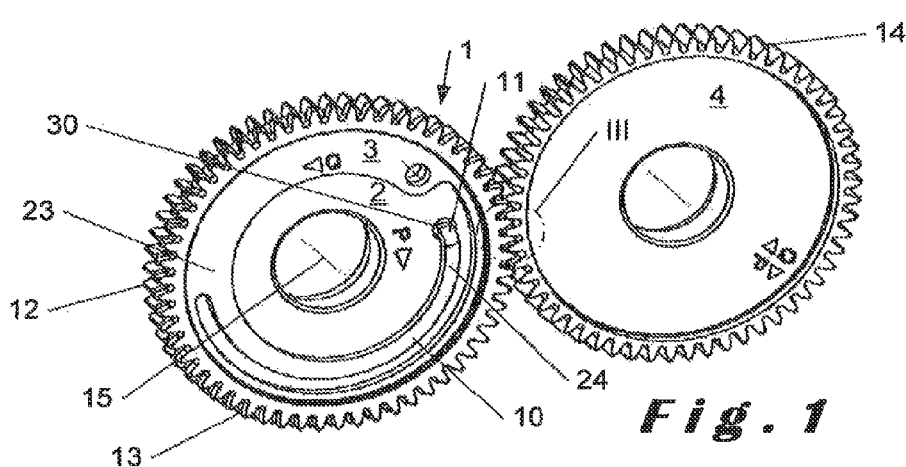
FIG. 1 shows a view in perspective of a pair of mating gear wheels in which one of the gears is a split gear according to the invention.

The split gear 1 can engage more than one mating gear 4. The number and location of the different mating gears 4 are not critical for the invention.

The split gear 1 preferably comprises mounting means for mounting the split gear 1 to a shaft. The mounting means are however not critical for the invention and can be determined by the person skilled in the art and can be for example: means for bolting the split gear 1 to the shaft, means for receiving the shaft in at least part of the split gear 1, etc. Although the mounting means can be provided at any one of the first 2 and second 3 gear or both, the mounting means preferably are provided on the first gear 2.

The first 12 and second 13 teeth engage teeth 14 of the mating gear 4. Although the teeth 12, 13, 14 shown in the figures run substantially parallel along the rotational axis 15, the direction of the teeth 12, 13, 14 of the first 2, second 3 and mating 4 gear is not critical for the invention and can be further adapted by the person skilled in the art depending on the application in which the split gear 1 is to be used.

The first 2 and the second 3 gear preferably are positioned substantially adjacently, although this is not critical for the invention and the first 2 and the second 3 gear can also be spaced apart. A first side 25 of the first gear 2 and a second side 26 of the second gear 3 oppose each other along the rotational axis 15 and extend substantially radially from the rotational axis 15 towards the respective teeth 12, 13 of the first 2 and the second 3 gear. When the gears 2, 3 are positioned adjacently, the first 25 and second 26 side of the first 2 and second 3 gear respectively are positioned adjacently.

The dimensions, form and number of the teeth 12, 13, 14 of the different gears shown are not critical and can all be adapted by the person skilled in the art, depending on the application in which the split gear 1 is to be used. Preferably the first 2 and the second 3 gear comprise substantially the same number of teeth 12, 13 and substantially the same diametric pitch.

Figures 4, 5:
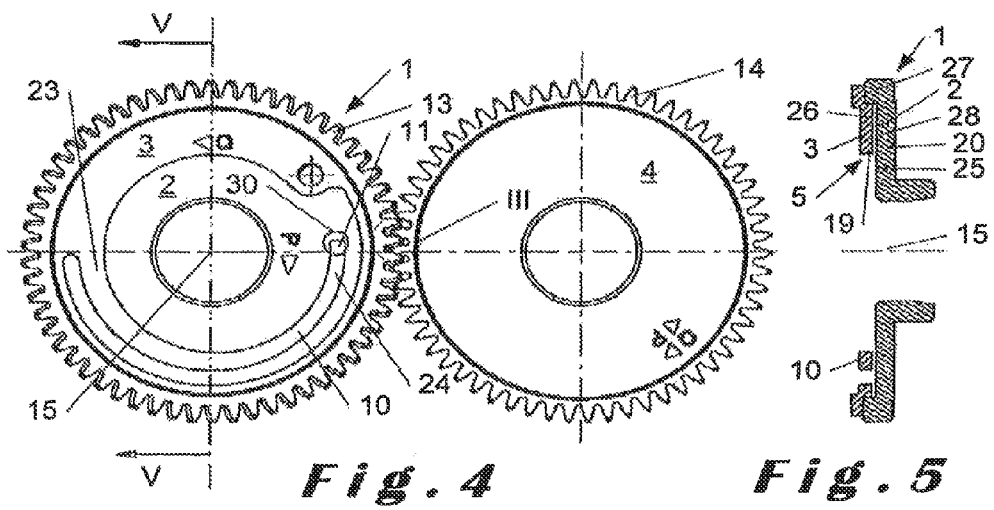
FIG. 4 shows a plan view of the split gear and the mating gear of FIG. 1.
FIG. 5 shows a sectional view V-V of FIG. 4.

The dimension and form of the first 2 and second 3 gear can be determined by the person skilled in the art as long as the resulting split gear 1 can engage a mating gear 4, as shown in FIGS. 1, 4 and 16C. Preferably, the form and dimension of the first 2 and the second 3 gear are substantially the same as for example shown in FIGS. 1, 4, 6, 7, 9, 10, 12A, 14A, 15, 16A, 16B, 17A, 17B, 17C, 17D.

Preferably the width of the split gear 1 measured along an axial direction of the split gear 1 substantially equals the width of the mating gear 4, as for example shown in FIG. 16B. The width of the split gear 1 can however be larger or smaller than the width of the mating gear 4.

When more than one mating gear 4 is provided, the width of the split gear 1 can for example substantially equal the width of the widest mating gear 4. This is however not critical for the invention and the width of the split gear can for example be wider than the respective widths of the different mating gears 4, for example when the mating gears 4 are shifted with respect to each other such that the mating gears 4 are no longer coplanar. In such a case the width of the split gear 1 preferably equals the total width of the assembly of the mating gears 4 along a direction running along their rotational axes. The split gear 1 shown in FIG. 15 for example is provided to preferably engage two mating gears shifted with respect to each other in a direction along the rotational axis 15.

Preferably, the first 2 and second 3 gear have a width which is proportional to the torques acting on to the respective gears 2, 3. For example, when the torques acting on the first gear 2 are substantially twice the torques acting on the second gear 3, the width of the first gear 2 is substantially twice the width of the second gear 3. In such case the second gear 3 has a width in axial direction which is approximately ⅓ of the width in axial direction of the split gear 1. Such dimensions are particularly suitable in case the split gear 1 drives or is direct or indirectly driven by a cam shaft of a combustion engine.

The width of the split gear 1 and the width of the first 2 and second 3 gear are however not critical for the invention and can be determined by the person skilled in the art depending on the specific application in which the split gear is going to be used.

The teeth 12, 13 of the first 2 and the second 3 gear are substantially aligned with each other when being engagingly mounted to teeth 14 of the mating gear 4. Thereto, the first 2 and second 3 gear are rotated with respect to each other around the rotational axis 15. Thereto, the split gear 1 comprises rotating means 5 for coaxially and rotatably interconnecting the first 2 and the second 3 gear at least partially around the rotational axis 15.

Figures 2, 3:
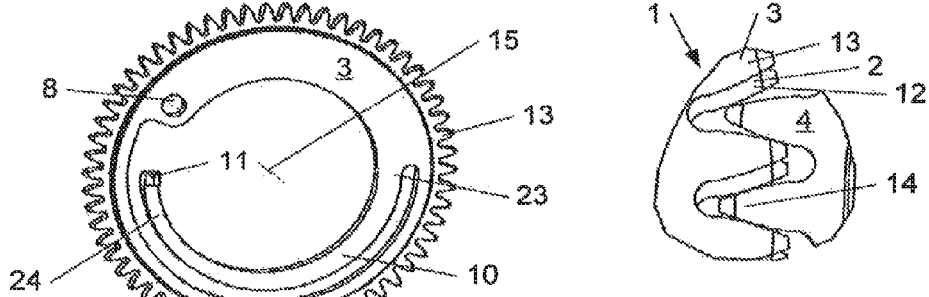
FIG. 2 shows a view of a component of the split gear wheel of FIG. 1.
FIG. 3 shows a detail of FIG. 1.

Further, the split gear 1 comprises a spring 10 for creating a negative moment between the first 2 and the second 3 gear, in a direction opposing the direction of rotation of the split gear 1, upon alignment of the teeth 12, 13 of the first 2 and the second 3 gear. The negative moment created by the spring 10 rotates the first 2 and second 3 gear with respect to each other around the rotational axis 15 until rotation is stopped by the teeth 14 engaging the teeth 12, 13 of the first 2 and the second 3 gear, as shown in detail in FIG. 3. Therefore, backlash between the split gear 1 and the mating gear 4 is avoided, as shown in FIG. 3 and any opposing torque between the mating gear 4 and the split gear 1 can be absorbed by the resilient mount of the first gear 2 with respect to the second gear 3 caused by the negative moment.

The spring 10 is integrally formed with the second gear 3, as can be seen from FIGS. 1, 2, 4, 6, 7, 9, 10, 12A, 12B, 14A, 14B, 14E, 15, 16A, 17A, 17C and 17D.

A detail of the second gear 3 which comprises the spring 10 integrally formed with the second gear 3 is shown in FIGS. 2, 12B, 14B and 15. The spring 10 shown in these figures of the second gear 3 are all torsion springs 10.

Preferably the torsion spring 10 is an annular spring 10. In the context of the current application with annular spring 10 is meant a torsion spring which substantially extends at least partly arcuately around the rotational axis 15. Upon rotation of the second gear 3 with respect to the first gear 2, the annular spring 10 deforms causing the creation of the negative moment. Possible examples of such annular springs 10 are: a wire spring, a coil spring, etc. Preferably, the annular spring 10 is a C-shaped spring extending arcuately and only partly around the rotational axis 15 as is shown in the figures.

Other examples of springs are for example: a leaf spring, etc.

The annular spring 10 preferably extends in an arcuate shape around the rotational axis 15 between the teeth 13 of the second spring 3 and the rotational axis 15. Other locations for the annular spring 10 are however possible and can be determined by the person skilled in the art.

Preferably, one end 23 of the annular spring 10 is attached to and integrally formed with, the remainder of the second gear 3. The other end 24 of the spring 10 preferably is adapted for being connected to the first gear 2. However, also other parts of the annular spring 10 can be connected with the second gear 3 and/or the first gear 2, these are however not shown in the figures.

Preferably, the spring 10 is substantially coplanar with a plane defined by the teeth 13 of the second gear 3. This is however not critical for the invention and the spring 10 can also substantially extend in a plane which is for example adjacent to and more preferable adjacent to a plane defined by the teeth 13 of the second gear 2.

The dimensions of the annular spring 10, such as the length between the first end 23 and the second end 24, the mean radius of the annular spring 10, the width of the annular spring 10 along a radial direction of the second gear 3, the thickness of the spring etc. among other things determine the resiliency of the spring 10 and therefore the amount of negative moment applied between the first 2 and the second 3 gear of the split gear 1.

Additionally, also the shape of the spring 10 determines the resiliency of the spring 10. The shape can be for example round, ellipse, square, rectangular, triangular etc. Moreover the shape is determined by the position of the first 23 and the second 24 end of the spring 10, etc.

The dimensions and shape of the spring 10 are however not critical for the invention and can be determined by the person skilled in the art depending among other things on the desired negative moment between the first 2 and the second 3 gear, the dimensional aspects of the environment in which the split gear 1 is to be mounted, the dimensions of the split gear 1 itself, especially the dimensions between the teeth 13 of the second gear 3 and the rotational axis 15, etc.

Preferably, the negative moment is provided to fully absorb the maximal opposing torque created by the mating gear 4, i.e. the negative moment is at least as large as the maximum opposing torque. More preferably, the negative moment substantially equals the opposing torque. Since the inventor has found that in such cases an optimal absorption of the opposing torque can be reached without offering a substantial excess in resiliency of the spring 10.

The desired negative moment depends on the application in which the split gear 1 will be used but preferably, the negative moment created is between 1 Nm-200 Nm. More preferably between 5 Nm-30 Nm and most preferably between 8 Nm and 20 Nm.

Preferably the first gear 2 can rotate with respect to the second gear 3 along an angle of between 5°-15°, preferably 8°-12°, measured between a first position of the first gear 2 with respect to the second gear 3 upon creation of the negative moment and a second position of the first gear 2 with respect to the second gear 3 in which the teeth of the first 2 and second 3 gear are aligned for mounting the split gear 1 to the mating gear 4.

The characteristics of the annular spring 10 and especially the width of the annular spring 10 preferably are chosen so that the torsion of the annular spring 10 is substantially homogeneously distributed over the annular spring 10.

Figure 15:
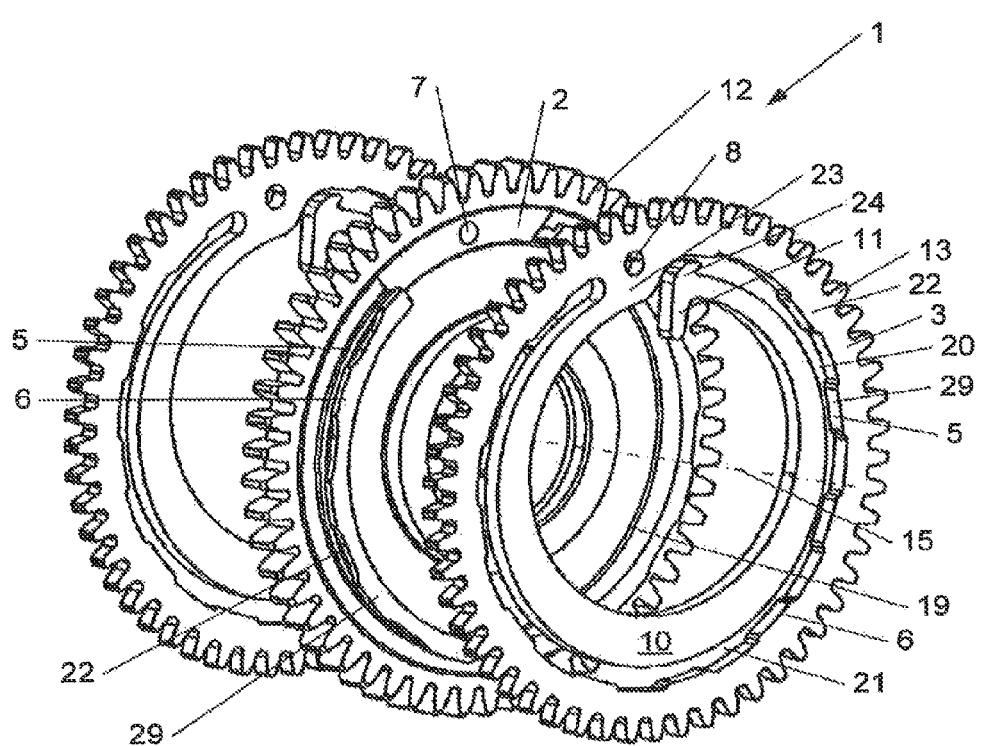
FIG. 15 shows an exploded view of another embodiment of a split gear according to the Invention.
Figure 17D:
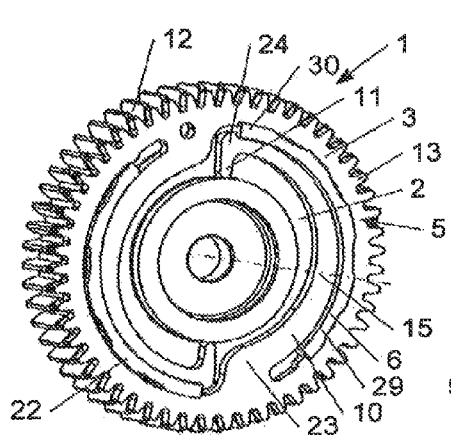
FIG. 17D shows a view in perspective of the split gear of FIG. 17A.
Figure 17A:
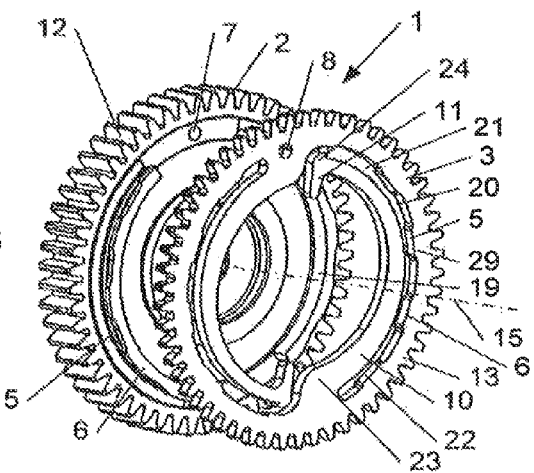
FIG. 17A shows an exploded view of a different embodiment of a split gear according to the invention.
Figure 17C:
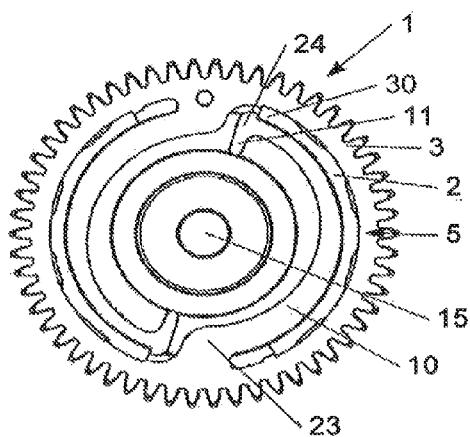
FIG. 17C shows a plan view of the split gear of FIG. 17A.
Figure 17B:
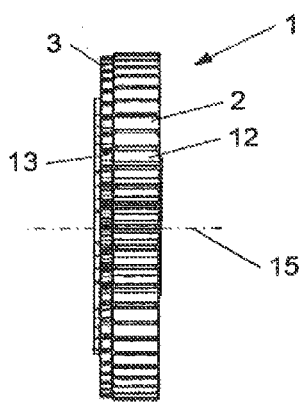
FIG. 17B shows a side view of the split gear of FIG. 17A.

Although it may be sufficient that the split gear 1 comprises a single spring 10, more springs 10 can be provided in the split gear 1, for example by providing more than one second gear 3 in the split gear 1 as for example shown in FIGS. 15, 16A and 16B and/or by providing more than one spring 10 as for example shown in FIGS. 17A, 17C and 17D in a single second gear 3, in which case the total negative moment created by the assembly of second gears 3 substantially equals the sum of the separate negative moments of the different springs 10.

The resiliency of the different springs 10 can be the same or differ from each other such that a different negative moment is offered by the different springs 10. Such that the negative moment can for example be adapted to the mating gear 4 which the first gear 2 and the respective second gears 3 engage. The negative moment of a single spring 10 preferably is maximally 50 Nm. More preferably between 5 Nm-30 Nm and most preferably between 8 Nm and 20 Nm.

As shown in FIG. 15, the different second gears 3 can be provided on different sides of the first gear 2. However, this is not critical for the invention and the different second gears 3 can also be provided on the same side of the first gear 2, as shown in FIG. 16B. FIG. 17D for example shows a second gear 3 in which more than one spring 10 is provided. The resiliency of the different springs 10 in the single second gear 3 can be the same or can differ but preferably is the same.

Preferably, adding several second gears 3 to obtain the desired negative moment is done when the negative moment of a single spring 10 is limited, for example due to the material, for example the thickness of the material, of the spring 10, the dimensions of the spring 10, the shape of the spring 10, etc. When the second gear 3 is for example pushed or fine cut, the thickness of the second spring 3 and therefore of the spring 10 is limited which limits the negative moment which can be created by the spring 10. In such case the desired negative moment can be obtained by adding several second gears 3 to the split gear 1, as described above. The different second gears 3 used in the split gear 1 can be the same or can differ, according to the specific application in which they are used.

Adding several second gears 3 to the spit gear 1 can also be done to engage several mating gears 4 with a reduced backlash. For example, the split gear 1 shown in FIG. 15 can engage two mating gears 4. One mating gear 4 mating with the first gear 2 and a first second gear 3 provided on a first side and a second mating hear 4 mating with the first gear 2 and a second second gear 3 provided on a second side of the split gear 1, the first and second side being opposing sides of the split gear 1.

Also more than one first gear 2 can be provided to the split gear 1. This is however not critical for the invention and can be determined by the person skilled in the art according to the specific application in which the split gear 1 will be used.

Preferably, the second gear 3 comprises an opening at the rotational axis 15 which allows a shaft to be put through the second gear 3, as for example shown in FIG. 2. The opening is however not critical for the invention and can be omitted such that the second gear 3 does not comprise an opening at the rotational axis 15.

The second gear 3 wheel preferably is made from metal, more preferably steel, more preferably spring steel such as for example Ck67, Ck75, Ck85, 50CrV4 and 51CrV4 according to DIN 17221 and DIN 17222. The inventor has found that when the second gear 3 is made from metal, the gear 3 can be used in warm environments, such as for example car engines with the desired negative moment. The material of the second spring 3 is however not critical for the invention and the second gear 3, and therefore the spring 10, can also be made from for example plastic, according to for example the desired negative moment and the application in which the split gear 1 will be used.

Although the second gear 3 can be provided to be directly mounted to a shaft, for example by connecting the shaft to the opening provided at the rotational axis or by bolting the second gear 3 to the shaft, this is not preferred. The second gear 3 however is preferably indirectly mounted to the shaft by means of the first gear 2.

The first gear 2 preferably is provided to be directly mounted to the shaft, for example by bolting the first gear 2 to the shaft. Preferably, the first gear 2 is mounted to the shaft by an opening provided in the first gear 2 at the rotational axis 15, as for example shown in FIGS. 1, 6, 7, 9, 10, 12C, 14C, 15. The form and dimensions of the opening depend on the shaft on which the split gear 1 is to be mounted.

The first gear 2 preferably is made from metal, more preferably steel, such as for example 16MnCr5, 42CrMo4, Ck45 according to DIN17200 and powder sinter metals. The inventor has found that when the first gear 2 is made from metal, the gear 2 can be used in warm environments, such as for example car engines with the desired negative moment. The material of the first gear 2 is however not critical for the invention and the first gear 2 can also be made from for example plastic, according to for example the desired negative moment and the application in which the split gear 1 will be used.

The split gear 1 preferably is substantially made from metal, preferably steel. The inventor has found that when the split gear 1 is made from metal, the gear 1 can be used in warm environments, such as for example car engines. The material of the split gear 1 is however not critical for the invention and the split gear 1 can also be made from for example plastic depending from the subjected torques and the environment in which the split gear 1 will be used.

Although the second gear 3 can be directly mounted on to the shaft rotatably with respect to the first gear 2, in which case the rotating means 5 are the mounting means for mounting the second gear to the shaft and the shaft, the rotating means 5 are preferably provided on the assembly of the first 2 and second 3 gear.

The rotating means 5 can be any means deemed appropriate by the person skilled in the art.

Preferably, the rotating means 5 are separate from the spring 10.

The rotating means 5 preferably comprise an engaging set of an annular protrusion 19 protruding from the first side 25 of the first gear 2 in direction of the rotational axis 15 and engaging means 20 provided in the second side 26, of the second gear 3 engaging around the annular protrusion 19. This is for example shown in FIGS. 1, 2, 4, 5, 6, 7, 8, 9, 10, 11, 12A, 12C, 12D, 12E, 14A, 14C, 14E, 15, 16A, 16D, 17A and 17D.

This is however not critical for the invention and in another embodiment of the rotating means 5, although not shown in the figures, the rotating means 5 comprise an engaging set of an annular protrusion 19 protruding from the second side 26 of the second gear 3 in direction of the rotational axis 15 and engaging means 20 provided in the first side 26, of the first gear 2 engaging around the annular protrusion 19.

The protrusion 19 can be provided on any location of the side 25, 26 of the relevant gear 2, 3. such as for example relatively near the rotational axis 15 relatively near the teeth 12, 13 of the relevant gear 2, 3.

The annular protrusion 19 can almost completely surround the rotational axis 15, as shown in for example FIGS. 2, 7, 11 or can only partly surround the rotational axis 15 such as shown in FIGS. 12C and 14C.

The relevant gear 2, 3 can be provided with a single protrusion 19 or can be provided with a multitude of protrusions 19 arranged along an annular path arranged so that the engaging means 20 can be guided along the annular path. This is however not shown in the figures.

The width of the protrusion 19 measured along radial direction of the split gear 1 can be relatively wide such as for example shown in FIGS. 8 and 11 or can be relatively small such as shown in FIGS. 12C, 14C, 15, 16A and 17A both as compared to the radius of the split gear 1.

The engaging means 20 can be any means known to the person skilled in the art suited to engage the protrusion 19. The engaging means 20 can be a recess provided in for example the side 25, 26 of the relevant gear 2, 3. The recess 20 can be an opening 21 provided through the relevant gear 2, 3. These aspects of the engaging means 20 can however be determined by the person skilled in the art and are not critical for the invention.

The dimensions and form of the protrusion 19 and the engaging means 20 can be determined by the person skilled in the art and are not critical for the invention.

A first example of such rotating means 5 are shown in FIGS. 1, 2, 4 and 5, 6, 7 and 8 and 9, 10 and 11 in which a first part of the first side 25 of the first gear 2 or a second part 28 of the second side 26 of the second gear 3 is located in a plane which is substantially parallel to and shifted to the plane formed by the respective teeth 13, 12 of the second 3 or the first 2 gear, so that the first or second part 28 forms the protrusion 19. The respective second or first gear 3, 2 comprises a clamping section 27, forming the engaging means 20, axially protruding from the respective second 26 or first 25 side comprising the second 13 or first 12 teeth which is provided to clamp around the first or second 28 part such that a rotatable connection between the first 2 and the second 3 gear is obtained. Although not critical for the invention it is preferred that the first gear 2 comprises the clamping section 27 which clamps around the second part 28 provided in the second gear 3. In this embodiment the protrusion 19 is provided relatively near the teeth 12, 13 of the first or second gear 2, 3 and is relatively wide. As can be observed the protrusion 19 preferably does not fully penetrates through the engaging means 20 and the engaging means 20 are only recesses provided in the respective side of the relevant gear. This is however not critical for the invention.

More preferably the second part 28 of the second gear 3 is received on top of the first side 25 of the first gear 2, as shown in FIGS. 5, 8, 11, or, in case the first part is clamped by a clamping section 27 which is provided in the second gear 2, the first part of the first gear 2 is received on top of the second side 26 of the second gear 3. This is however not critical for the invention.

In a second example of such rotating means 5, the protrusion 19 is provided relatively near the rotational axis 15. In this case the protrusion 19 preferably delimits the hole in the first gear 2 for receiving the shaft and has a relatively small width. The engaging means 20 in that case is an opening 21 provided in the second gear 3 and is provided to fit over the protrusion 19. The protrusion 19 in other words is provided to fully penetrate through the engaging means 20, which is an opening 21 through the respective side of the relevant gear 2, 3.

In a third example the protrusion 19 and the engaging means 20 are provided on the first 2 or second 3 gear substantially between the teeth 12, 13 of the first 2 or second gear 3 and the rotational axis 15. This embodiment is shown in FIGS. 12A-17D. In these figures the engaging means 20 are openings 21 provided in the second gear 3 and the protrusion 19 is an annular rim protruding from the first gear 2 which also has a relatively small width.

The rotating means 5 can comprise a combination of the first, second, third or any other example within the meaning of the terms rotating means 5.

Preferably the split gear 1 comprises fastening means 6 for fixing the axial position of the first gear 2 with respect to the second gear 3 along the rotational axis 15. These fastening means 6 are however not critical for the invention. A split gear 1 which does not comprise fastening means 6 is for example shown in FIG. 1-5.

Any fastening means 6 known to the person skilled in the art can be used for fixing the axial position of the first gear 2 with respect to the second gear 3.

Preferably, the rotating means 5 comprise the fastening means 6, although this is not critical for the Invention.

A first embodiment of the fastening means 6 are shown in FIG. 6 in which the fastening means 6 comprise a fastening ring 16 which can be clamped to the protrusion 19. Although the clamping ring 16 fixes the axial position of the first ring 2 with respect to the second ring 3, the rotatability of the first ring 2 with respect to the second ring 3 preferably is not hindered.

Although the clamping ring 16 can be made as a separate piece, as shown in FIG. 6, the fastening means 6 can also be made in one piece with one of the first 2 or second 3 ring, as for example shown in FIGS. 9, and 11. FIGS. 9, 10 and 11 show a clamping ring comprising two legs 17 which are part of the rotating means 5.

The clamping ring 16 preferably is resiliently such that it can be positioned more easily over the protrusion 9. This is however not critical for the invention and other possibilities known to the person skilled in the art are possible.

The protrusion 9 preferably comprises a circumferential groove 18 into which the clamping ring 16 can be received such that the axial position of the first gear 2 with respect to the second gear 3 can be further fixed.

The fastening means 6 in a further preferred embodiment comprises a bayonet mount 22 for fixing the axial position of the first gear 2 with respect to the second gear 3 upon alignment of the teeth 12, 13 of the first 2 and second 3 gear. The bayonet mount is for example shown in FIG. 12A-12C, in FIGS. 14A-14C and in FIG. 15.

The bayonet mount 22 preferably comprises radially extending cooperating outwardly and inwardly extending lips 29 which extend from the protrusion 19 and the engaging means 20. The lips 29 are positioned such that they at least partly become adjacent to each other in axial direction of the split gear 1, fixing the axial position of the first 2 and second gear 3, when the teeth 12, 13 of the first 2 and second 3 gear are aligned. Preferably, the lips 29 of the second gear 3 are substantially coplanar with the teeth 13 of the second gear 3.

Preferably the second end 24 of the spring 10 is adapted to being attached to the first gear 2. The second end 24 thereto for example comprises a hooked part 11 which is provided to hook in receiving means 30 provided on the first gear 2. These receiving means 30 can for example be a recess in the first side 25 of the first gear 2, in which case the hooked part 11 comprises a part in axial direction of the split gear 1, such as shown in FIGS. 1, 2, 4, 6, 7, 9 and 10. In other example the hooked part 11 hooks after part of the protrusion 19 provided on the first gear such as shown in FIGS. 12A-12C and 13A.

However the protrusion 19 provided on the first gear can also be provided with a hooked part 11 designed to engage the end part 24 of the spring 10 as shown in FIGS. 14A-14C.

Preferably the split gear comprises means allowing to temporarily interlock the angular position of the first gear with respect to the second gear upon alignment of the teeth 12, 13 of the first 2 and second 3 gear. These means can be in the form of a first 7 and a second 8 recess provided in the first 2 and second 3 gear of which at least one fully penetrates the gear 2, 3 in which it is provided, which become aligned upon alignment of the teeth 12, 13 of the first 2 and second 3 gear. The recesses 7, 8 are subsequently preferably connected to each other by a pin 9. Such a pin 9 is for example shown in FIGS. 6, 7, 9, 10. The recesses 7, 8 are for example shown in FIGS. 1, 2, 4, 12A-12D, 14A-14C, 14E, 15, 16A and 17A.

The invention claimed is:

1. Split gear (1) for avoiding backlash when engaging a mating gear (4), comprising a first (2) toothed gear wheel and second (3) toothed gear wheel, rotating means (5) for coaxially interconnecting the first (2) and second (3) gear wheels at least partially rotatable with respect to each other around a mutual rotational axis (15) and a spring (10) having first and second opposing ends and resiliently interconnecting the first (2) and second (3) gear wheels for creating a negative moment between the first (2) and second (3) gear wheels upon alignment of the teeth (12, 13) of the first (2) and second (3) gear wheels by rotation of the first (2) gear wheel with respect to the second (3) gear wheel so that the mating gear (4) can be engaged, wherein the spring (10) is integrally formed at the first end with the second (3) gear wheel, wherein the rotating means (5) comprises an annular protrusion having an end and protruding from a first radially extending side of one of the first (2) and second (3) gear wheels in direction of the rotational axis (15) and an engaging recess provided in a second radially extending side, adjacent to the first radially extending side of respectively the second or first gear wheel, engaging around the annular protrusion, wherein the annular protrusion surrounds the spring, and wherein the end of the protrusion is a hooked part engaging the second end of the spring or the second end of the spring is a hooked part engaging the end of the annular protrusion.

2. Split gear as claimed in claim 1, wherein the spring (10) is separate from the rotating means (5).

3. Split gear as claimed as claimed in claim 1, wherein the spring (10) is a torsion spring.

4. Split gear as claimed in claim 3, wherein the spring (10) is an annular spring.

5. Split gear as claimed in claim 1, wherein, the spring (10) is substantially coplanar with the second gear wheel (3).

6. Split gear as claimed in claim 1, wherein the split gear (1) comprises fastening means (6) for fixing the axial position of the first gear wheel (2) with respect to the second gear wheel (3) along the rotational axis (15).

7. Split gear as claimed in claim 6, wherein the fastening means (6) comprises a bayonet mount (22) for fixing the axial position of the first gear wheel (2) with respect to the second gear wheel (3) upon alignment of the teeth (12, 13) of the first (2) and second (3) gear wheels.

8. Split gear as claimed in claim 6, wherein the rotating means (5) comprises the fastening means (6).

9. Split gear as claimed in claim 1, wherein the protrusion (19) is provided in the first gear wheel (2) and the engaging recess (20) is provided on the second gear (3) wheel.

10. Split gear as claimed in claim 1, wherein the split gear (1) comprises means for temporarily interlocking the angular position of the first gear wheel (2) with respect to the second gear wheel (3) upon alignment of the teeth (12, 13) of the first (2) and second (3) gear wheels.

11. Split gear as claimed in claim 1, wherein the negative moment is between 8-30 Nm.

12. Split gear as claimed in claim 1, wherein the first gear wheel (2) is rotatable with respect to the second gear wheel (3) along an angle of between 5°-15° measured between a first position of the first gear wheel (2) with respect to the second gear wheel (3) upon creation of the negative moment and a second position of the first gear wheel (2) with respect to the second gear wheel (3) in which the teeth of the first (2) and second (3) gear wheels are aligned for mounting the split gear (1) to the mating gear (4).

13. Split gear as claimed in claim 1, wherein the first gear wheel (2) is rotatable with respect to the second gear wheel (3) along an angle of between 8°-12° measured between a first position of the first gear wheel (2) with respect to the second gear wheel (3) upon creation of the negative moment and a second position of the first gear wheel (2) with respect to the second gear wheel (3) in which the teeth of the first (2) and second (3) gear wheels are aligned for mounting the split gear (1) to the mating gear (4).

\* \* \* \* \*